Nov. 9, 1965 A. J. TAYLOR 3,216,400
VERTICAL NUCLEAR BOILER
Original Filed Feb. 1, 1960 5 Sheets-Sheet 1
FIG. IA.
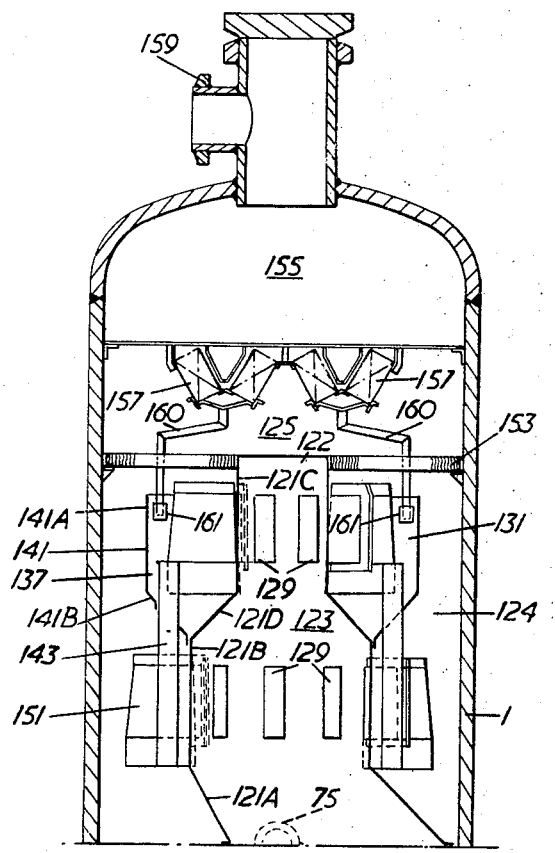
INVENTOR.
Anthony James Taylor
BY
ATTORNEY INVENTOR.
Anthony James Taylor
BY
ATTORNEY Nov. 9, 1965 A. J. TAYLOR 3,216,400
VERTICAL NUCLEAR BOILER
Original Filed Feb. 1, 1960 5 Sheets-Sheet 3
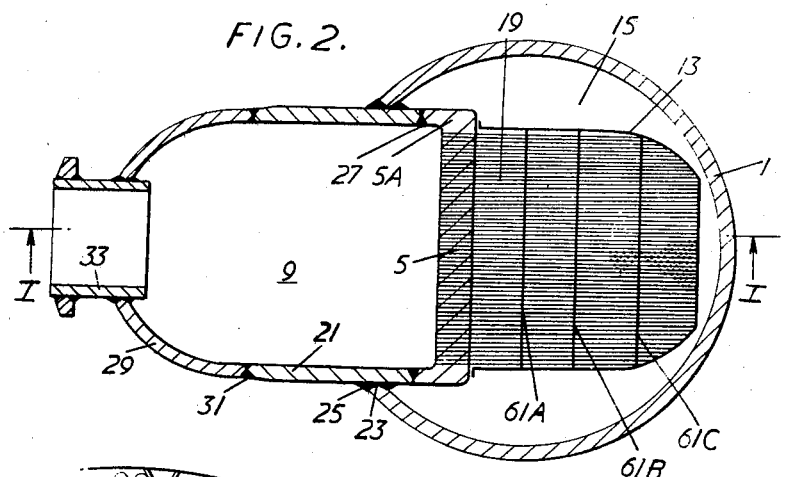
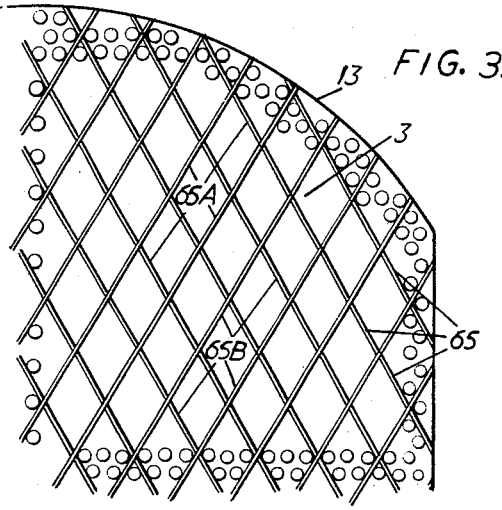
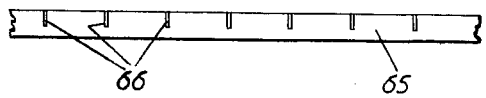
INVENTOR.
Anthony James Taylor
BY
ATTORNEY

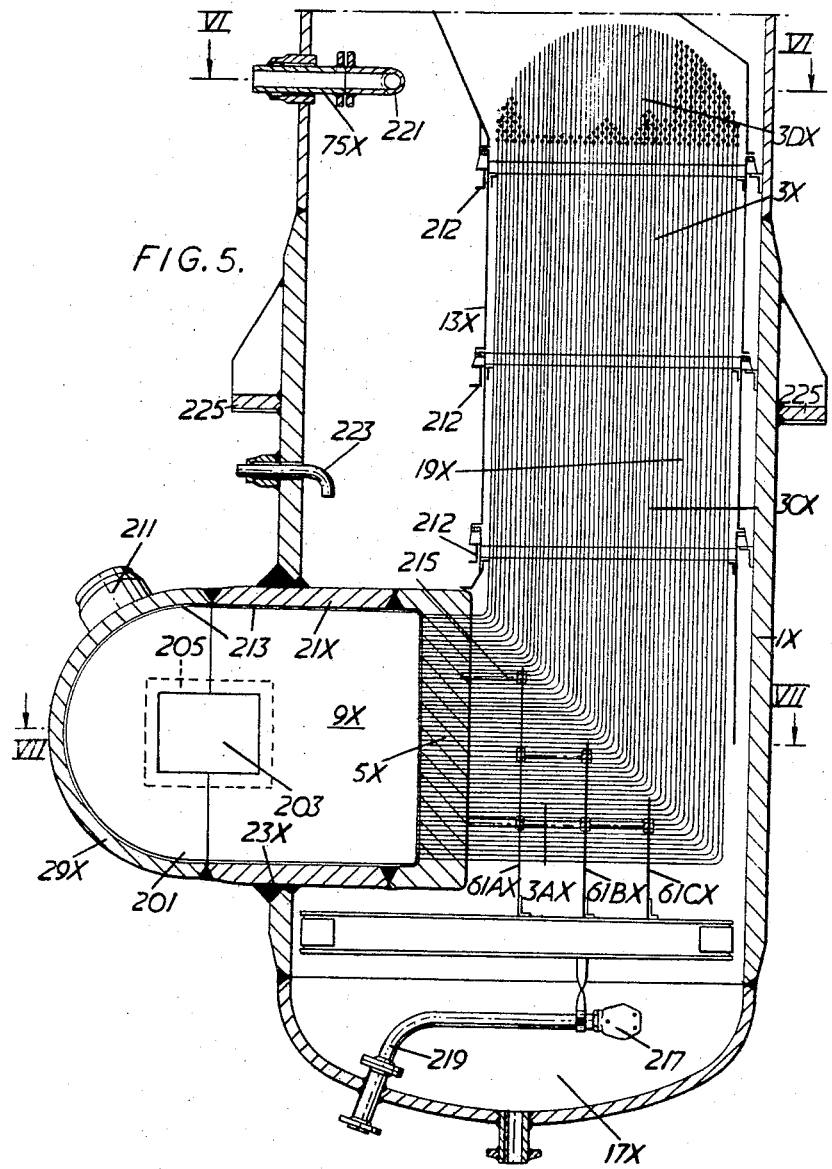

Nov. 9, 1965   A. J. TAYLOR   3,216,400
VERTICAL NUCLEAR BOILER
Original Filed Feb. 1, 1960   5 Sheets-Sheet 5
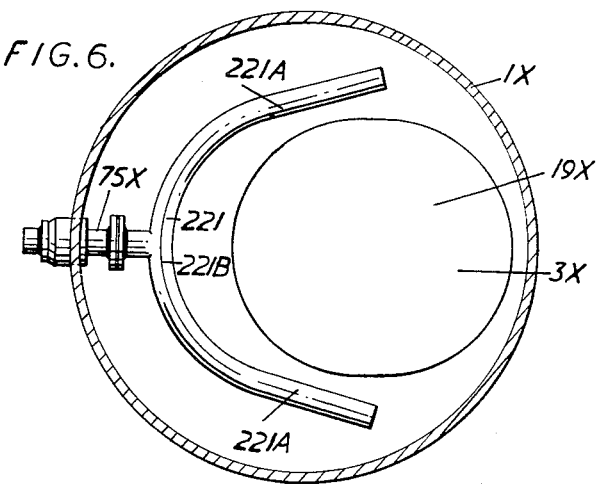
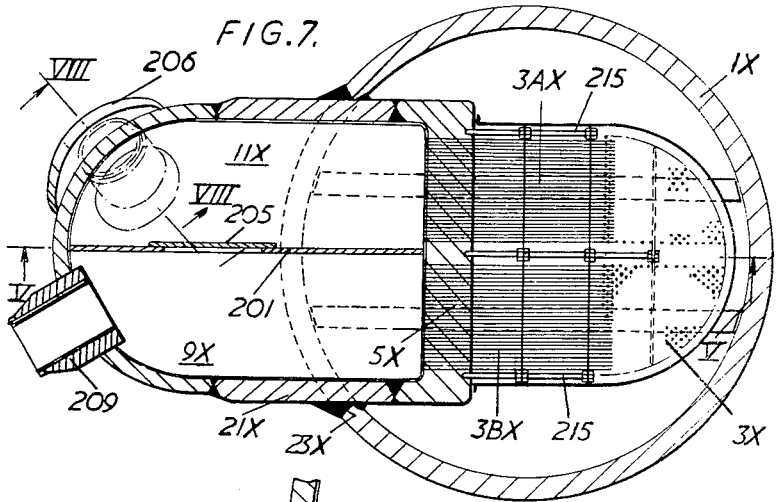
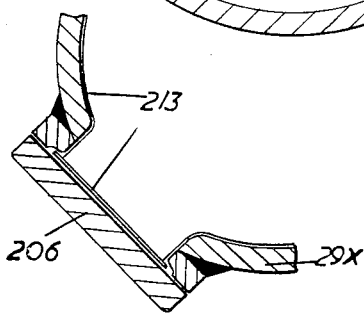
*INVENTOR.*
Anthony James Taylor
BY
ATTORNEY

United States Patent Office 3,216,400
Patented Nov. 9, 1965

3,216,400
VERTICAL NUCLEAR BOILER
Anthony J. Taylor, London, England, assignor to Babcock & Wilcox, Limited, London, England, a company of Great Britain
Continuation of application Ser. No. 5,975, Feb. 1, 1960. This application Dec. 21, 1961, Ser. No. 167,992
Claims priority, application Great Britain, Feb. 25, 1959, 6,538/59
7 Claims. (Cl. 122—34)

This application is a continuation of my co-pending application, Serial No. 5,975, filed February 1, 1960, now abandoned.

This invention relates to tubular vapor generators and to steam generating systems incorporating water-cooled nuclear reactors, an object being the provision of an advantageous form of vapor generator suitable for use in the generation of steam in power plants incorporating water-cooled nuclear reactors.

A tubular vapor generator according to the present invention has a pressure vessel containing a bank of upright, spaced tubes the ends of which are shaped to extend laterally to tube plate means disposed at the inner ends of inlet and outlet chambers projecting laterally from the pressure vessel wall into the pressure vessel and a jacket surrounding the tube bank to form, between the tubes, an internal riser space open at the bottom to a liquid space of the vessel and in communication at the top with a vapor space of the vessel and, between the jacket and the wall of the vessel, and external downcomer space.

The various features of novelty which characterize the invention are pointed out with particularity in the claims annexed to and forming a part of this specification. However, for a better understanding of the invention, its operating advantages and specific objects attained by its use, reference should be had to the accompanying drawings and descriptive matter in which are illustrated and described preferred embodiments of the invention.

In the drawings:

FIGS. 1A and 1B are sectional side elevations of upper and lower parts respectively of a steam generator, taken on the line I—I of FIG. 2 and as viewed in the direction of the arrows;

FIG. 2 is a sectional plan view taken on the line II—II of FIG. 1B;

FIG. 3 is a sectional plan view of a small part of the tube bank and taken on the line III—III of FIG. 1B;

FIG. 4 is a side elevation of a spacing strip shown in FIG. 3;

FIG. 5 is a sectional side elevation of the lower part only of an alternative form of steam generator and corresponds to FIG. 1B;

FIG. 6 is a sectional plan view taken on the line VI—VI of FIG. 5;

FIG. 7 is a sectional plan view taken on the line VII—VII of FIG. 5; and

FIG. 8 is a sectional side elevation of a manhole shown in FIG. 7 and is taken on the line VIII—VIII of that figure and as viewed in the direction indicated by the arrows.

Figure 1B:
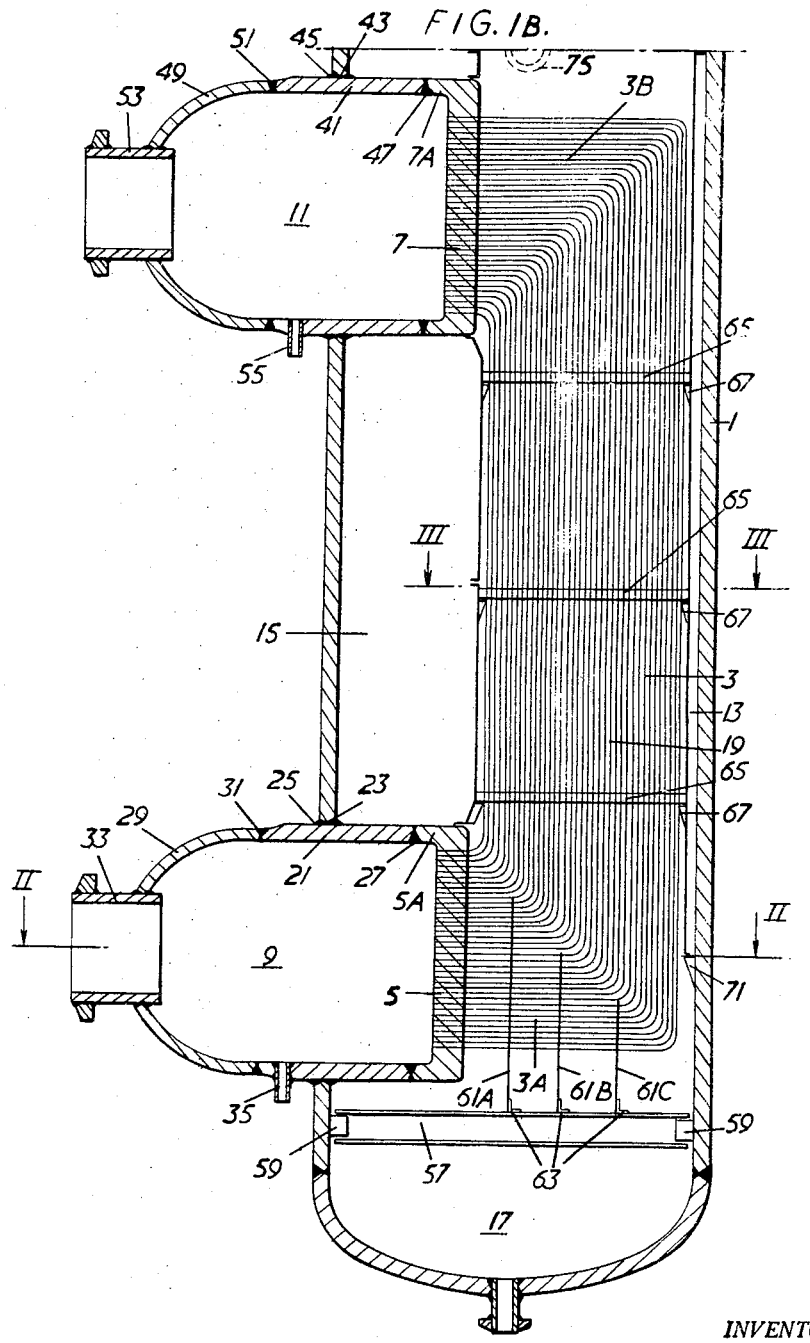

Referring first to the embodiments of FIGS. 1A to 4, the steam generator includes a cylindrical pressure vessel 1 arranged with its axis vertical and having its upper and lower ends closed by dished end parts welded to the cylindrical part of the vessel. Disposed within a lower part of the pressure vessel is a bank 3 of upright tubes the ends of which are shaped to extend laterally as indicated at 3A and 3B to tube plates 5 and 7 arranged respectively at the inner ends of an inlet chamber 9 and an outlet chamber 11 which extend laterally through the pressure vessel wall. The tube bank 3 is enclosed by a sheet metal jacket 13 which defines between itself and the pressure vessel wall an annular downflow space 15 communicating at its lower end with a space 17 below the inlet chamber 9. At its lower end, the jacket 13 terminates on the center line of the tube plate 5 so that the space 15 is in communication through space 17 with a heat exchange chamber 19 enclosed by the jacket 13, open at its lower end and containing the tubes of the tube bank 3.

The inlet chamber 9 comprises a cylindrical wall part 21 which extends through an aperture 23 in the side wall of pressure vessel 1 and extends both inwardly and outwardly of the pressure vessel from that aperture. Peripheral welds 25 secure the part 21 to the pressure vessel. The tube plate 5 is flat and circular in shape with a peripheral flange 5A extending towards and welded at 27 to the part 21. The outer end of the cylindrical part 21 is closed by a domed closure member 29 secured thereto by a weld 31 and provided with a nozzle 33 for the passage of the heating fluid. Outside the wall of the pressure vessel 1, the part 21 is provided with a drain connection 35 from which extends a suitably valved water disposal pipe, not shown.

The arrangement of the outlet chamber 11 is similar to that of the inlet chamber 9, it including a cylindrical wall part 41 extending to an aperture 43 in the pressure vessel wall, to which it is secured by circumferential welds 45, and connected by a circumferential weld 47 to a peripheral flange 7A of the tube plate 7. The outer end of part 41 is closed by a domed closure member 49 secured to part 41 by a circumferential weld 51 and provided with a nozzle 53 for the passage of the heating fluid. Chamber 11 is provided with a drain connection 55.

Support means are provided at the lower end of the tube bank 3 arranged to support the tubes by engaging the lateral extensions 3A thereof. H-section girders 57 extend across a lower part of the pressure vessel 1 in a direction parallel to that of the lateral extensions 3A of the tubes of the tube bank and are supported at their ends by lugs 59 welded to the inner surface of the pressure vessel wall. Vertically extending metal plates 61A, 61B and 61C are secured at their lower ends to angle brackets 63 which extend transversely of the griders 57 and rest thereon. Each of the plates 61A, 61B and 61C is formed with holes through which the lateral extensions 3A of the tubes in bank 3 extend. As is clear from FIG. 1B, each of the plates 61A, 61B and 61C extends into the tube bank as far as the region in which the tubes are bent to form the lateral extensions 3A. In this manner, the plate 61A extends upwardly for some three quarters of the height of tube plate 5, the plate 61B extends upwardly to a level just above the centerline of the tube plate 5 and the plate 61C extends upwardly to about one quarter of the height of the tube plate 5. The arrangement is such that the lateral extensions of greatest length pass through all the plates 61A, 61B and 61C, and as the extensions become shorter they pass fewer of the support plates, the shortest extensions being unsupported by the plates.

At three spaced levels in the bank 3, spacing means are provided adapted to maintain the spacing of the tubes of the tube bank. At each level two sets of spacing strips 65 are arranged (see FIGS. 3 and 4) with the strips 65A of one set crossing the strips 65B of the other set at an angle decided by the arrangement of the tubes in the tube bank. As indicated in FIG. 4, the lower strips 65B are formed along their upper edge with transverse slots 66 spaced apart by a distance equal to three times the pitch of the rows of tubes of the tube bank. The upper strips 65A are similarly slotted but on their underneath edges and the strips are assembled together so that the slots in the upper strips and the slots 66 in the lower strips are opposite one another, the upper strips occupy the slots in the lower strips and the lower strips occupy the slots in the upper strips. In this manner a grid is formed the thickness of which in the direction of the length of the tubes is that of but one strip. It will be seen that a grid formed in this manner is quite rigid and able to position the tubes against lateral displacement. Strips of each pair of sets disposed at different levels extend between different rows of tubes of the bank 3, so that the spaces between adjacent rows of tubes are each occupied by one strip somewhere in the height of the tube bank. The strips 65A and 65B of each set are supported (see FIG. 1B) at their ends on lugs 67 mounted on the inner side of the jacket 13. Suitably the supports for the strips are in the form of bands disposed inside the jacket and formed with radially extending flanges upon which the ends of the strips rest.

At its lower end, the jacket 13 is supported partly by a lug 71 welded to the inner surface of the pressure vessel wall 1 and partly by the tube plate 5, to which it is seal welded.

Adjacent the upper end of the tube bank 3, a water inlet nozzle 75 is welded to the pressure vessel wall and is arranged to supply feed water to downflow space 15.

The jacket 13 is seal welded to the tube plate 7 and its upper end is connected to a sheet metal casing 121 including a lower, crank section 121A, connecting the upper end of jacket 13, which is offset from the longitudinal axis of pressure vessel 1, to a casing part coaxial with the vessel and comprising a lower cylindrical section 121B, and intermediate frusto-conical casing section 121D and a top cylindrical casing section 121C of lesser diameter than the casing section 121B and closed at its upper end by a wall 122. Casing 121 defines a vapor and liquid receiving space 123 separated by the casing from a surrounding annular vapor space 124 and a superjacent vapor space 125.

Two tiers of centrifugal separators are arranged to receive the vapor and liquid mixture from the space 123. These centrifugal separators are of a well known kind having a whirl chamber with an upright axis, a tangential inlet for the vapor and liquid mixture, an upper outlet for separated vapor and a lower annular peripheral outlet for separated liquid. Each of the cylindrical parts of the vapor and liquid space 123 is provided with outlet ports 129 spaced about the periphery of the casing and severally communicating with the tangential liquid and vapor inlets of the separators. Thus, each centrifugal separator 131 in the upper tier is disposed close to the casing section 121C and is joined by a flanged connection to an outlet duct leading from one of the ports 129.

These centrifugal separators 131 of the upper tier are arranged to discharge separated liquid downwardly into a trough 137 which completely encircles the casing section 121C. The trough 137 extends upwardly to within a short distance of the tops of the centrifugal separators 131 and comprises an inner wall constituted by frusto-conical part 121D of the casing 121 which connects the cylindrical parts 121B and 121C, and a lower portion of the cylindrical casing section 121C and an outer wall 141 comprising an upper cylindrical part 141A and a lower inverted frusto-conical part 141B terminating at its lower edge at the bottom of the aforesaid frusto-conical section 121D. Two diametrically opposite drain tubes 143 extend through the lower part of the outer wall of the trough 137 from a suitable level above the bottoms of the centrifugal separators 131 to a level below the normal liquid level in the pressure vessel, which level is about midway between the top and bottom of the cylindrical casing section 121B. The centrifugal separators 151 of the lower tier are severally connected to the vapor and liquid space 123 through the ports 129 in the casing section 121B. These separators 151 are disposed in two similar symmetrically arranged groups, the spacing between the adjacent end separators of the two groups being slightly greater than the spacing between adjacent separators in each group to provide the space necessary for the drain tubes 143. These centrifugal separators are arranged to discharge separated liquid below the normal water level and the separators are positioned close to the cylindrical casing section 121B.

The annular space between the top of the casing section 121C and the wall of the pressure vessel 1 is provided with scrubber means 153 in the form of corrugated strips closely arranged to define therebetween narrow sinuous passages for the upward flow of the vapor discharged from the centrifugal separators 131 and 151. These scrubber means are located a short distance above the outlets for the discharge of separated vapor from the centrifugal separators 131 of the upper tier. Above the scrubber means 153, in the vapor space 125 are disposed further scrubber means 157 comprising corrugated plates closely arranged to define therebetween narrow sinuous passages for the upward flow of vapor from the space 125 to a vapor outlet space 155 provided with a steam outlet 159. Water separated in and draining from the scrubber means 157 flows through drain pipes 160 into channels 161 disposed in trough 137 and acting as water seals for the lower ends of these pipes.

The vapor generator described above is, in use, connected to a source of hot gases or hot liquid. For example, it is used in combination with a nuclear reactor and means for circulating coolant fluid in a closed circuit through the core of the nuclear reactor and through the bank of heating tubes 3, the flow of hot coolant being in an upward direction through tubes of tube bank 3. For example, the nuclear reactor may be a pressurized water reactor, the coolant being water under pressure.

During operation, when the heated coolant is circulating through the bank of tubes 3, the water within the pressure vessel 1 is heated and boils. By natural circulation, the water within the heat exchange chamber 19 rises and the liquid and vapor mixture enters the vapor and liquid receiving space 123, whence it is discharged through the outlet ports 129 to the tangential inlets of the centrifugal separators 131 and 151. The separated vapor discharged upwardly by the centrifugal separators enters the annular vapor space 124 above the normal liquid level in the pressure vessel and flows through the scrubber means 153 and 157 to the vapor outlet space 155 whence it flows to a steam turbine or other vapor utilizing means. The liquid separated by the centrifugal separators 151 of the lower tier is discharged directly by the separators below the normal liquid level in the pressure vessel, while the liquid separated by the centrifugal separators 131 of the upper tier is discharged below the liquid level in the trough 141. The centrifugal separators 131 of the upper tier are therefore able to operate in the normal manner, despite the fact that their liquid outlets are above the normal liquid level in the pressure vessel. The liquid collected in the trough 141 spills over through the drain tubes 143 so that the water level within the trough is maintained substantially constant at a suitable level. The liquid discharged by the centrifugal separators 131 and 151, which is substantially free from steam bubbles, together with feed liquid supplied to the pressure vessel through feed water inlet 75, enters the annular downcomer space 15 surrounding the heat exchange chamber 19 and flows downwardly towards the liquid space 17, thence flowing upwardly into the open lower end of the jacket 13.

It will be seen that heat transmitted through the jacket 13 of the heat exchange chamber 19 is absorbed by water flowing downwardly about that jacket. Furthermore, since the annular downflow space 15 and the bottom of the pressure vessel are filled with relatively cold water, the heat losses through the wall of pressure vessel 1 can be maintained relatively low.

Referring now to the alternative embodiment of the invention illustrated in FIGS. 5, 6, 7 and 8 of the drawings, the construction is, in many respects, similar to that of the embodiment illustrated in FIGS. 1A and 1B. Parts are, therefore, given the numerals allocated to corresponding parts in FIGS. 1A and 1B, but with the addition of the suffix "X." The tube bank 3X, arranged within the pressure vessel 1X, is formed by tubes bent to a U-shape, arranged with the straight portions 3CX vertical and with nested return bends 3DX at the top of the bank. Both ends of each tube lie, therefore, at the lower end of the tube bank, and these ends are bent laterally as indicated at 3AX and 3BX and are connected to a vertical tube plate 5X, disposed at the inner ends of heating fluid inlet chamber 9X and outlet chamber 11X. The outer wall of chambers 9X and 11X is similar to that of the chamber 9 illustrated in FIG. 1B, but a vertical baffle wall 201 is welded about its periphery to the tube plate 5X, to the cylindrical wall part 21X and to the domed closure member 29X. A manhole 203 in the baffle wall 201 is closed by a plate 205 removable from the outlet chamber 11X side of the wall, which chamber is provided with a mandoor 206 (see FIGS. 7 and 8). Inlet chamber 9X is provided with a nozzle 209 extending from the domed closure member 29X for the flow of heated coolant, the axis of this nozzle lying in the same horizontal plane as the axis of the cylindrical wall part 21X. Outlet chamber 11X is provided with a nozzle 211 for the flow of coolant, also extending from the domed closure member 29X and having its axis inclined upwardly and outwardly from the wall of the pressure vessel.

The jacket 13X is supported, on the side nearer the tube plate 5X, on cross girders 212 secured at their ends to the pressure vessel wall.

In this embodiment of the invention, the tubes of the tube bank 3 are formed of austenitic stainless steel and the interiors of the inlet and outlet chambers are lined with a layer 213 of austenitic stainless steel. This feature can, of course, be applied to the embodiment of FIGS. 1A and 1B. The plates 61AX, 61BX and 61CX which support the lateral extensions 3AX and 3BX of the tubes of tube bank 3 are braced by stay bolts 215 extending between the plates and in some cases screwed into the tube plate 5X. In the liquid space 17X is arranged a steam operated heater 217 having a supply pipe 219 extending through the wall of the casing, and utilized to heat up the steam generator gradually before heated coolant is supplied from the nuclear reactor, so avoiding overcooling of the coolant and thermal shock in the steam generator. The feed water inlet nozzle 75X is arranged vertically above the inlet and outlet chambers 9X and 11X and is provided with a U-shaped distributor 221 arranged with its arms 221A on opposite sides of the chamber 19X and its intermediate part 221B vertically above the inlet and outlet chambers. A nozzle 223 extends through the wall of the pressure vessel a short distance above the inlet and outlet chambers 9X and 11X and has a downwardly directed inner end, this nozzle being utilized for the addition of chemicals to the water in the pressure vessel. The part of the pressure vessel to which the inlet and outlet chambers are affixed is of increased wall thickness, and is provided externally with support brackets 225.

The arrangement of tubes and tube plates in the manner described with respect to each of the embodiments enables adequate circulation of water over the outer sides of the tubes of the tube bank to be obtained while utilizing the pressure vessel for steam generating and steam separation and possesses the advantage that the use of a tube plate with a horizontal face is avoided. It will be appreciated that corrosion troubles are liable to arise with a horizontal tube plate owing to the collection on the face of the tube plate of sediment which is liable to promote corrosion. In the arrangement described, a tube plate having an upright face is obtained and the face is swept by the circulating water.

The form of vapor generator described avoids the use of flanged openings for enabling tube renewal to be effected, since, by cutting away the tube plate or tube plates from the cylindrical wall part or parts of the inlet and outlet chambers and cutting away the head from the top of the pressure vessel, the whole tube bank may be lifted out of the pressure vessel 1 and replaced by a new tube bank or replaced after repair, the tube plate or plates and the pressure vessel then being rewelded in position.

It will be appreciated that the comparative ease of replacement of the nest of tubes is of great practical importance. This is particularly so when the tubes are of austenitic stainless steel prone to stress corrosion from alkalies or halides, especially where sea water contamination of the feed water may occur as when the boiler is arranged to generate steam for ship propulsion.

Furthermore, the form of vapor generator described avoids the use of a separate steam drum with associated risers and downcomers and is therefore well suited for mobile use as on board ship, since the pressure vessel has considerable inherent resistance to shock forces which may arise during service.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a vapor generator having wall means forming a vertically elongated pressure vessel arranged to operate with a vapor space above a body of liquid therein, a vapor outlet from said vapor space, a jacket cooperating with said vessel to form an interior vertically elongated vapor generation compartment open at the bottom and a downcomer passage exterior of said compartment arranged for the downward flow of liquid from said body of liquid to supply said vapor generation compartment, and vapor-liquid separating means for separating vapor-liquid mixtures received from said vapor generation compartment arranged to discharge separated liquid to said body of liquid and vapor to said vapor space, the improvement of means forming a heating fluid inlet chamber and heating fluid outlet chamber, each chamber projecting laterally through the wall means of said pressure vessel and into said downcomer passage and formed at its inner end with an opening, an upwardly extending bank of tubes disposed within and arranged to substantially fill said vapor generation compartment and including upright substantially straight tube lengths extending to a level substantially above the level of at least one of said chambers and provided with outwardly projecting lateral inlet and outlet tubular extensions, and means for passing a heating fluid through said bank of tubes, said last named means including said inlet and outlet chambers with the inlet chamber supplying fluid to and the outlet chamber receiving fluid discharges from all of the tubes in said vapor generation compartment, and tube plate means rigidly united and registering with the openings at the inner ends of said inlet and outlet chambers and connected to and arranged to hold the inlet and outlet ends of said tubular extensions of all of the tubes in said vapor generation compartment and extending upwardly to inhibit the collection of deposits on the side of the plate means facing the vapor generation compartment.

2. A vapor generator having wall means forming a vertically elongated pressure vessel, a jacket cooperating with said vessel to form an interior vertically elongated vapor generation compartment open at its bottom and a downcomer passage exterior of said compartment arranged for the downward flow of a heat absorbing liquid to said compartment, means forming a heating fluid inlet chamber and heating fluid outlet chamber, each chamber projecting laterally through the wall means of said vessel and into said downcomer passage and formed at its inner end with an opening, and upwardly extending bank of tubes disposed within said compartment and arranged to substantially fill said vapor generation compartment and including upright substantially straight tube lengths extending to a level substantially above the level of at least one of said chambers and provided with outwardly projecting lateral inlet and outlet tubular extensions, and means for passing a heating fluid through said bank of tubes in indirect heat transfer relation with said heat absorbing liquid, said last named means including said inlet and outlet chambers with the inlet chamber supplying fluid to and the outlet chamber receiving fluid discharges from all of the tubes of said tube bank, and tube plate means rigidly connected to and registering with the openings at the inner ends of said inlet and outlet chambers and connected to and arranged to hold the inlet and outlet ends of said tubular extensions of all the tubes of said tube bank and extending upwardly to inhibit the collection of deposits on the side of the plate means facing said vapor generation compartment.

3. A vapor generator having wall means forming a vertically elongated pressure vessel, a jacket cooperating with said vessel to form an interior vertically elongated vapor generation compartment open at its bottom and a downcomer passage exterior of said compartment arranged for the downward flow of a heat absorbing liquid to said compartment, means forming a heating fluid inlet chamber and heating fluid outlet chamber, each chamber, projecting laterally through the wall means of said vessel and into said downcomer passage and formed at its inner end with an opening, an upwardly extending bank of tubes disposed within said compartment and arranged to substantially fill said vapor generation compartment and including upright substantially straight tube lengths extending to a level substantially above the level of at least one of said chambers and provided with outwardly projecting lateral inlet and outlet tubular extensions, and means for passing a heating fluid through said bank of tubes in indirect heat transfer relation with said heat absorbing liquid, said last named means including said inlet and outlet chambers with the inlet chamber supplying fluid to and the outlet chamber receiving fluid discharges from all of the tubes of said tube bank, and tube plate means weld-united to and registering with the openings at the inner ends of said inlet and outlet chambers and connected to and arranged to hold the inlet and outlet ends of said tubular extensions of all the tubes of said tube bank and extending vertically to inhibit the collection of deposits on the side of the plate means facing said vapor generation compartment.

4. A vapor generator having wall means forming a vertically elongated pressure vessel, a jacket cooperating with said vessel to form an interior vertically elongated vapor generation compartment open at its bottom and a downcomer passage exterior of said compartment arranged for the downward flow of a heat absorbing liquid to said compartment, means forming a heating fluid inlet chamber and heating fluid outlet chamber, each chamber projecting laterally through the wall means of said vessel and into said downcomer passage and formed at its inner end with an opening, an upwardly extending bank of tubes disposed within said compartment and including upright substantially straight tube lengths extending to a level substantially above the level of at least one of said chambers and provided with outwardly projecting lateral inlet and outlet tubular extensions, means for passing a heating fluid through said bank of tubes in indirect heat transfer relation with said heat absorbing liquid, said last named means including said inlet and outlet chambers with the inlet chamber supplying fluid to and the outlet chamber receiving fluid discharges from all of the tubes of said tube bank, and tube plate means rigidly connected to and registering with the openings at the inner ends of said inlet and outlet chambers and connected to and arranged to hold the inlet and outlet ends of said tubular extensions of all the tubes of said tube bank and extending upwardly to inhibit the collection of deposits on the side of the plate means facing said vapor generation compartment, and means for carrying the weight of and maintaining the relative positions of said tubes including a support beam disposed under said tube bank and secured to the wall means of said vessel, and means for transmitting the load of said straight tube lengths while permitting longitudinal movement thereof.

5. A vapor generator having wall means forming a vertically elongated pressure vessel, a jacket cooperating with said vessel to form an interior vertically elongated vapor generation compartment open at its bottom and a downcomer passage exterior of said compartment arranged for the downward flow of a heat absorbing liquid to said compartment, means forming a heat fluid inlet chamber and heating fluid outlet chamber, each chamber projecting laterally through the wall means of said vessel and into said downcomer passage and formed at its inner end with an opening, an upwardly extending bank of tubes disposed within said compartment and arranged to substantially fill said vapor generation compartment and including upright substantially straight tube lengths extending to a level substantially above the level of at least one of said chambers and provided with outwardly projecting lateral inlet and outlet tubular extensions, means for passing a heating fluid through said bank of tubes in indirect heat transfer relation with said liquid, said last named means including said inlet and outlet chambers with the inlet chamber supplying fluid to and the outlet chamber receiving fluid discharges from all of the tubes of said tube bank, and tube plate means rigidly connected to and registering with the openings at the inner ends of said inlet and outlet chambers and connected to and arranged to hold the inlet and outlet ends of said tubular extensions of all the tubes of said tube bank and extending upwardly to inhibit the collection of deposits on the side of the plate means facing said vapor generation compartment, and means for preventing lateral displacement of said tube lengths, while permitting longitudinal movement thereof, said last named means including two adjacent sets of spacing strips arranged with the strips of one set crossing the strips of the other set and so disposed as to space apart adjacent rows of the upright tube lengths, the strips of the two sets being interengaged by means of transverse slots in the strips to form a rigid grid.

6. A vapor generator having wall means forming a vertically elongated pressure vessel, a jacket cooperating with said vessel to form an interior vertically elongated vapor generation compartment open at its bottom and a downcomer passage exterior of said compartment arranged for the downward flow of a heat absorbing liquid to said compartment, means forming a heating fluid inlet chamber and a heating fluid outlet chamber vertically spaced from said inlet chamber, each chamber projecting laterally through the wall means of said vessel and into said downcomer passage and formed at its inner end with an opening, an upwardly extending bank of tubes disposed within said compartment and arranged to substantially fill said vapor generation compartment and including upright substantially straight tube lengths extending from the level of said inlet chamber to the level of said outlet chamber and provided with outwardly projecting lateral inlet and outlet tubular extensions, and means for passing a heating fluid through said bank of tubes in indirect heat transfer relation with said heat absorbing liquid, said last named means including said inlet and outlet chambers with the inlet chamber supplying fluid to and the outlet chamber receiving fluid discharges from all of the tubes of said tube bank, and tube plate means rigidly connected to and registering with the openings at the inner ends of said inlet and outlet chambers and connected to and arranged to hold the inlet and outlet ends of said tubular extensions of all the tubes of said tube bank and extending upwardly to inhibit the collection of deposits on the side of the plate means facing said vapor generation compartment.

7. A vapor generator having wall means forming a vertically elongated pressure vessel, a jacket cooperating with said vessel to form an interior vertically elongated vapor generation compartment open at its bottom and a downcomer passage exterior of said compartment arranged for the downward flow of a liquid to said compartment, means forming a heating fluid inlet chamber and heating fluid outlet chamber disposed at the same elevation as said inlet chamber, each chamber projecting laterally through the wall means of said vessel and into said downcomer passage and formed at its inner end with an opening, an upwardly extending bank of tubes disposed within said compartment and arranged to substantially fill said vapor generation compartment and including upright substantially straight tube lengths extending to a level substantially above the level of said chambers and provided with outwardly projecting lateral inlet and outlet tubular extensions, and means for passing a heating fluid through said bank of tubes in indirect heat transfer relation with said heat absorbing liquid, said last named means including said inlet and outlet chambers with the inlet chamber supplying fluid to and the outlet chamber receiving fluid discharges from all of the tubes of said tube bank, and tube plate means rigidly connected to and registering with the openings at the inner ends of said inlet and outlet chambers and connected to and arranged to hold the inlet and outlet ends of said tubular extensions of all the tubes of said tube bank and extending upwardly to inhibit the collection of deposits on the side of the plate means facing said vapor generation compartment.

References Cited by the Examiner
UNITED STATES PATENTS

| | | | |
|---|---|---|---|
| 1,947,863 | 2/34 | Mahoney | 257—216 |
| 2,833,526 | 5/58 | Otten et al. | 257—221 |
| 2,862,479 | 12/58 | Blaser et al. | 122—34 |

PERCY L. PATRICK, *Primary Examiner.*

FREDERICK L. MATTESON, JR., *Examiner.*